D. S. BUFFALOW.
SHOVEL FOR CULTIVATORS.
APPLICATION FILED APR. 22, 1913.

1,124,106.  
Patented Jan. 5, 1915.

Witnesses:  
Christ Feinle, Jr.

Inventor,  
Drury S. Buffalow.  
By Victor J. Evans,  
Attorney.

THE NORRIS PETERS CO., WASHINGTON, D. C.

UNITED STATES PATENT OFFICE.

DRURY S. BUFFALOW, OF PONDCREEK, OKLAHOMA, ASSIGNOR OF ONE-THIRD TO JOSEPH B. GROTTS AND ONE-THIRD TO WILLIAM R. FINNEY, BOTH OF PONDCREEK, OKLAHOMA.

SHOVEL FOR CULTIVATORS.

1,124,106.  Specification of Letters Patent.  Patented Jan. 5, 1915.

Application filed April 22, 1913. Serial No. 762,833.

*To all whom it may concern:*

Be it known that I, DRURY S. BUFFALOW, a citizen of the United States, residing at Pondcreek, in the county of Grant and State of Oklahoma, have invented new and useful Improvements in Shovels for Cultivators, of which the following is a specification.

This invention relates to clamping devices to be used especially in connection with cultivators, and it has for its principal object to produce a simple and efficient clamping device whereby the cultivator blade or shovel may be connected with the standard in a simple and effective manner.

A further object of the invention is to produce a clamping device of the character described which by the loosening or manipulation of a single nut on one of the clamp bolts will permit the vertical adjustment of the device on the cultivator standard and also the rocking or pivotal movement of the clamp, together with the cultivator blade associated therewith.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

Figure 1:
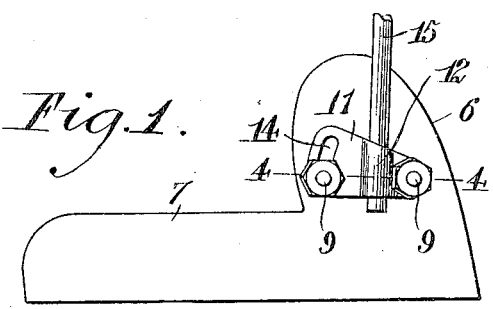
Figure 2:
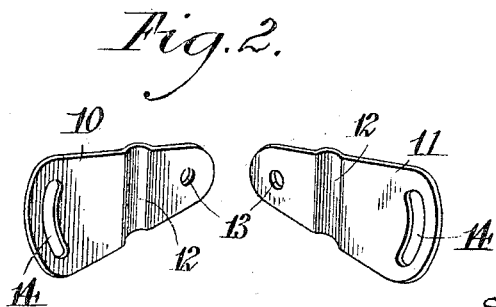
Figure 3:
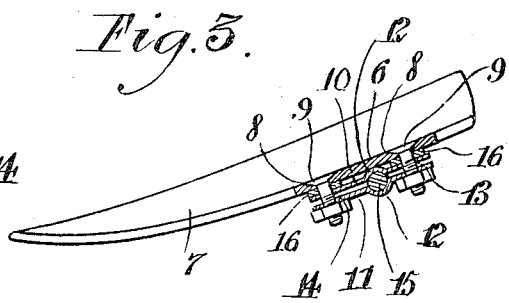

In the drawing, Figure 1 is a rear elevation of the same with dotted lines showing various adjustments of the shovel. Fig. 2 is a perspective view of the clamping device, showing the component parts of the same separated. Fig. 3 is a horizontal sectional view taken on the line 4—4 in Fig. 1.

Corresponding parts in the several figures are denoted by like characters of reference.

The cultivator blade or shovel 6 may be in the nature of a right or left hand plow having a laterally extending wing or blade 7 for the purpose of cutting weeds and noxious plants. The blade 6 is provided with apertures 8 for the passage of bolts 9 by means of which the blade is connected with a clamping device consisting of front and rear plates 10 and 11 which are relatively wide at one end and tapered in the direction of the opposite end, said plates being provided in their opposed faces with vertical grooves 12. The plates 10 and 11 are provided near their relatively narrow ends with apertures 13 and near their relatively wide ends with arcuate slots 14 that are concentric with the apertures 13, said apertures and slots being for the passage of the bolts 9. The grooves 12 are for the reception of the standard 15 of an ordinary cultivator on which the clamping plates 10, 11 and the plow or shovel 6 are mounted by means of the bolts 9.

When, as shown in the accompanying drawings, the clamping plates 10 and 11 are formed of sheet metal that has been struck up to form the grooves 12, it will be understood that such metal should preferably be sufficiently stiff to perform the clamping function in an efficient manner. To assist in bringing about this result it may be found desirable to interpose washers between the front clamping plate 10 and the blade 7, said washers being placed on the bolts 9, as seen in Fig. 3.

It will be readily seen that by loosening the nut on the bolt which passes through the slots 14, the plow or shovel together with the said bolt which passes through the slots 14 may be moved about the axis of the bolt extending through the apertures 13, thus enabling the plow or shovel to be tilted to various positions. While the nut is loosened it is also evident that the clamping plates may be adjusted vertically of the knee or standard 15 to various positions with respect to the surface of the ground. By retightening the nuts, the parts may be securely assembled in adjusted position.

It will be seen from the foregoing that I have provided a very simple and effective device including a weed cutting blade for cultivators and means whereby said blade may be easily and quickly adjusted and secured in position for operation.

Having thus described the invention, what is claimed as new, is:—

The combination with a standard, of a clamping device comprising front and rear plates having vertical standard engaging grooves in their opposed faces, said plates being provided with registering apertures intermediate the grooves and one end of the plates and with arcuate slots intermediate the grooves and the other end of the plates, clamping bolts extending through the apertures and the arcuate slots, a member carried by the clamping bolts adjacent to the outer face of one clamp plate and adjustable therewith, and washers carried by the bolts intermediate the adjustable member and the proximate clamp; the bolts being provided with nuts engaging the mate to the clamp plate engaged by the washers.

In testimony whereof I affix my signature in presence of two witnesses.

DRURY S. BUFFALOW.

Witnesses:
    JOSEPH B. GROTTS,
    WILLIAM R. FINNEY.

Copies of this patent may be obtained for five cents each, by addressing the "Commissioner of Patents, Washington, D. C."